United States Patent [19]

Wilsch-Irrgang et al.

[11] Patent Number: 5,861,371
[45] Date of Patent: Jan. 19, 1999

[54] LAUNDRY AFTERTREATMENT COMPOSITIONS

[75] Inventors: Anneliese Wilsch-Irrgang, Sprockhoevel; Theodor Voelkel, Erkrath; Thomas Merz, Hilden, all of Germany

[73] Assignee: Henkel-Ecolab GmbH & Co. OHG, Duesseldorf, Germany

[21] Appl. No.: 836,161

[22] PCT Filed: Oct. 27, 1995

[86] PCT No.: PCT/EP95/04224

§ 371 Date: May 5, 1997

§ 102(e) Date: May 5, 1997

[87] PCT Pub. No.: WO96/14375

PCT Pub. Date: May 17, 1996

[30] Foreign Application Priority Data

Nov. 5, 1994 [DE] Germany .......................... 44 39 570.1

[51] Int. Cl.⁶ ...................................................... C11D 1/835
[52] U.S. Cl. ........................... 510/504; 510/506; 510/524
[58] Field of Search .................................. 510/433, 504, 510/506, 522, 524

[56] References Cited

U.S. PATENT DOCUMENTS

| | | | |
|---|---|---|---|
| 3,775,316 | 11/1973 | Berg et al. ................................ | 252/8.8 |
| 4,040,966 | 8/1977 | Steinhauer et al. ...................... | 252/8.8 |
| 4,308,024 | 12/1981 | Wells .......................................... | 8/137 |
| 4,789,491 | 12/1988 | Chang et al. ............................ | 252/8.75 |
| 4,976,885 | 12/1990 | Wisotzki et al. .................. | 252/174.17 |
| 5,194,472 | 3/1993 | Wilson et al. ........................... | 524/238 |
| 5,399,272 | 3/1995 | Swartley et al. ........................ | 252/8.8 |
| 5,723,435 | 3/1998 | Severns et al. .......................... | 510/499 |

FOREIGN PATENT DOCUMENTS

| | | |
|---|---|---|
| 299787 A2 | 1/1989 | European Pat. Off. . |
| 0 404 471 | 12/1990 | European Pat. Off. . |
| 407040 A2 | 1/1991 | European Pat. Off. . |
| 0 643 128 | 3/1995 | European Pat. Off. . |
| 19 22 047 | 1/1971 | Germany . |
| 25 03 026 | 7/1976 | Germany . |
| 29 43 606 | 5/1980 | Germany . |
| 1 538 094 | 1/1979 | United Kingdom . |

*Primary Examiner*—Paul Lieberman
*Assistant Examiner*—John R. Hardee
*Attorney, Agent, or Firm*—Ernest G. Szoke; Wayne C. Jaeschke; Real J. Grandmaison

[57] ABSTRACT

An aqueous composition for the post-treatment of washed laundry containing 0.1 to 30% by weight of a water-insoluble quaternary ammonium compound, 0.1 to 50% by weight of a water-soluble quaternary ammonium compound, 0 to 5% by weight of a terpene compound, 0.1 to 20% by weight of a water-soluble acid, and 0.1 to 20% by weight of an emulsifier.

7 Claims, No Drawings

LAUNDRY AFTERTREATMENT COMPOSITIONS

BACKGROUND OF THE INVENTION

1. Field of the Invention

This invention relates to compositions for the aftertreatment of washed laundry in the form of an aqueous preparation of stably dispersed or clearly solubilized fabric softener compounds and other auxiliaries for improving fabric hygiene and deodorizing properties.

2. Discussion of Related Art

Laundry aftertreatment compositions are mainly intended to provide washed laundry with a soft full feel and to avoid stiffness after drying. Quaternary ammonium compounds containing two or three long-chain alkyl, alkenyl or acyloxyethyl groups in the form of aqueous dispersions are normally used for this purpose. It is also known that compositions of the type in question can be provided with antimicrobial activity using water-soluble quaternary ammonium compounds containing two short alkyl groups and two medium-length alkyl groups, for example didecyl dimethyl ammonium chloride (cf. Soap & Chem. Spec., March 1969, 47–52, 86).

Unfortunately, this does involve serious stability problems. According to DE 25 03 026 A1, a mixture of quaternary ammonium salts and dialkyl imidazolinium salts is used as the fabric softener and fatty alcohols, lower alcohols and emulsifiers are used to stabilize the dispersions.

It has also been proposed to adjust fabric softeners to acidic pH values in order to neutralize alkaline detergent residues on the fabrics and to make them easier to wash out.

Finally, it is known that pine oil and other wood distillates and terpene-like components thereof have a deodorizing and slight germ-inhibiting effect.

The problem addressed by the present invention was to provide a laundry aftertreatment composition in the form of an aqueous preparation of known fabric softener compounds with improved fabric hygiene, deodorizing and acidifying properties without affecting its stability in storage or Theological properties by correspondingly designing the formulation.

It was found that stably dispersed or clearly solubilized preparations of water-insoluble and water-soluble quaternary ammonium compounds and optionally terpene compounds are obtained, even in the presence of acids, by suitably designing the formulation.

DESCRIPTION OF THE INVENTION

Accordingly, the present invention relates to a composition for the aftertreatment of washed laundry in the form of an aqueous preparation containing (A) 0.1 to 30% by weight of a water-insoluble quaternary ammonium compound corresponding to formula I:

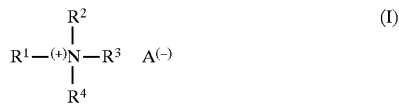

in which $R^1$ and $R^2$ are alkyl groups containing 16 to 22 carbon atoms or groups with the formula $R^5CO(XC_nH_{2n})_a$, where $R^5CO$ is a linear acyl group containing 16 to 22 carbon atoms, X is oxygen or —NH—, n=2 or 3, a=1 to 4, $R^3$ has the same meaning as $R^1$ or $R^2$ or is an alkyl group containing 1 to 4 carbon atoms and $R^4$ is an alkyl group containing 1 to 4 carbon atoms or a hydroxyalkyl group containing 2 to 4 carbon atoms and $A^{(-)}$ is a halide or methoxysulfate anion, (B) 0.1 to 50% by weight of a water-soluble quaternary ammonium compound corresponding to formula II:

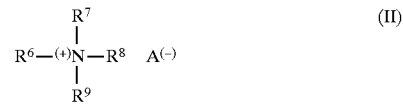

in which $R^6$ is an alkyl group containing 6 to 16 carbon atoms, $R^7$ is an alkyl group containing 1 to 12 carbon atoms or a benzyl group, $R^8$ and $R^9$ are alkyl groups containing 1 to 4 carbon atoms or hydroxyalkyl groups containing 2 to 4 carbon atoms and $A^{(-)}$ is a halide or methoxysulfate anion, (C) 0 to 5% by weight of a terpene compound or a wood oil distillate containing such compounds, (D) 0.1 to 20% by weight of a water-soluble inorganic acid or organic carboxylic acid or hydroxycarboxylic acid containing 1 to 6 carbon atoms for adjusting the preparation to a pH value of 1.0 to 5.0 and (E) 0.1 to 20% by weight of an emulsifier of the ethylene oxide adduct type with an HLB value of 12 to 19.

In the context of the invention, water-insoluble quaternary ammonium compounds (A) are understood to be quaternary ammonium compounds which do not form a clear solution in pure water at 20° C in a concentration of 0.1% by weight.

Water-soluble quaternary ammonium compounds (B) are understood to be quaternary ammonium compounds which form a clear solution in pure water at 20° C. in a concentration of 1% by weight.

The compositions according to the invention have a low consistency and are readily miscible with water. The preparations can be obtained as transparent or completely clear solubilizates by selecting the preferred quantity ratios of components A to E and the preferred structures. The following more detailed observations are made in this regard:

Suitable water-insoluble cationic fabric softener compounds (A) are any of the quaternary ammonium compounds (QUATS) of formula I containing at least two long-chain alkyl, alkenyl or acyl groups which are known for this purpose. Examples of such compounds are distearyl dimethyl ammonium chloride or distearamidoethyl hydroxyethyl methyl ammonium chloride. Particularly preferred fabric softener compositions according to the invention are those which contain as the QUAT a compound corresponding to formula I in which $R^1$ and $R^2$ are acyloxyalkyl groups with the formula $R^5CO(OC_nH_{2n})_a$—, where $R^5CO$ is a linear acyl group containing 16 to 18 carbon atoms, n=2 or 3 and a=1 to 4, $R^3$ has the same meaning as $R^1$ or $R^2$ or is an alkyl group containing 1 to 4 carbon atoms and $R^4$ is an alkyl group containing 1 to 4 carbon atoms or a hydroxyalkyl group containing 2 to 4 carbon atoms and $A^{(-)}$ is a halide or methoxysulfate anion. These preferred so-called esterquats are not only more readily biodegradable, they can also be processed more easily to the required stable dispersions or solubilizates.

Particularly suitable compounds of formula 1, in which $R^1$ and $R^2$ are acyloxyethyl groups with the formula $R^5CO(OC_2H_4)_2$—, where $R^5CO$ is an oleyl group or an acyl group derived from a tallow or palm oil fatty acid containing more than 50% by weight of oleic acid, are marketed under the names of STEPANTEX® VS 90 and STEPANTEX® DO 90.

Particularly preferred water-soluble quaternary ammonium compounds (B) are compounds corresponding to formula II in which $R^6$ and $R^7$ are alkyl groups containing 6 to 12 carbon atoms and preferably 8 or 10 carbon atoms. A particularly suitable compound is didecyl dimethyl ammonium chloride which is commercially available under the name of BARDAC® 22 or BARDAC® 2270E (70% in ethylene glycol).

Suitable terpene compounds (C) are terpene hydrocarbons, ketones, ethers, terpene alcohols or wood oil distillates which contain such terpene compounds in relatively large quantities. Preferred terpene compounds are terpene alcohols such as, for example, α- and β-terpineol, dihydro-α-terpineol, α-fenchyl alcohol, borneol, isoborneol, α-fenchol and the pine oil particularly rich in these compounds which is obtained by extraction from root wood of various softwoods and distillation as a low-boiling fraction. Other terpene compounds, for example methanol, camphor, fenchone or pinene, are also suitable. It is preferred to use pine oil.

Suitable water-soluble acids (D) are, for example, phosphoric acid, sulfuric acid, hydrochloric acid or mixtures of such mineral acids. However, it is preferred to use organic carboxylic acids containing 1 to 4 carbon atoms or hydroxycarboxylic acids containing 2 to 6 carbon atoms, for example formic acid, acetic acid, glycolic acid, lactic acid, citric acid, tartaric acid, malic acid, oxalic acid, maleic acid, fumaric acid and succinic acid.

Suitable emulsifiers (E) are any surface-active products of the addition of ethylene oxide to hydroxyfunctional fatty compounds, for example to fatty alcohols, to fatty amines, to fatty acids, to fatty acid mono- and diglycerides, to sorbitan fatty acid esters, to alkanediols and to alkanediol monoglycol ethers, which have an HLB value of 12 to 19. The HLB value is intended to be a measure of hydrophilicity and may be calculated, for example, in accordance with the equation HLB=(100-L)/5, where L is the content of lipophilic alkyl or acyl groups in % by weight of the ethylene oxide adduct.

Particularly suitable emulsifiers are products of the addition of 5 to 25 moles of ethylene oxide to adducts of ethylene glycol with linear 1,2-epoxyalkanes containing 10 to 16 carbon atoms. The ring opening of terminal epoxyalkanes with ethylene glycol leads to alkane-1,2-diol monoglycol ethers which can be further reacted with ethylene oxide to form alkane-1,2-diol polyglycol ethers. These alkane-1,2-diol polyglycol ethers are particularly preferred emulsifiers for the purposes of the present invention because they are particularly suitable for the production of transparent or clearly solubilized formulations of the composition according to the invention.

The content of fabric softener compounds (A) selected from quaternary ammonium compounds corresponding to formula I in the compositions according to the invention may be very small in cases where only a deodorizing, bacteriostatic and acidifying aftertreatment is required. In most cases, however, a softening effect is also required, particularly in the case of household fabric softeners. In products such as these, the water-insoluble quaternary ammonium compound (A) is preferably used in a quantity of 1 to 10% by weight.

The antibacterial water-soluble quaternary ammonium compound (B) is normally used in quantities of 2 to 15% by weight in order to leave an adequate antibacterial effect behind on the washing after dilution in the ratio normally used for fabric softener concentrates of 1:500 to 1:5,000.

The pine oil preferably used as the terpene compound (C) is preferably used in a quantity of 0.1 to 2% by weight. The water-soluble acid (D) is intended to provide the undiluted product with a pH value which is preferably in the range from 1 to 4 and which, even after dilution in a ratio of 1:1,000, should still be below pH 5. Quantities of 1 to 10% by weight of formic acid, glycolic acid or lactic acid are particularly suitable for this purpose.

Where a $C_{10-16}$ alkanediol polyglycol ether containing 8 to 20 glycol ether groups is used as the emulsifier (E), a quantity of 1 to 10% by weight is particularly suitable for the production of a clearly solubilized preparation according to the invention. Accordingly, the preferred fabric softeners according to the invention which are water-clear in appearance preferably contain (A) 1 to 10% by weight of the water-insoluble quaternary ammonium compound corresponding to formula I, (B) 2 to 15% by weight of the water-soluble quaternary ammonium compound corresponding to formula II:

(C) 0.1 to 2% by weight of pine oil as the terpene compound, (D) 1 to 10% by weight of formic acid, glycolic acid or lactic acid, (E) 1 to 10% by weight of a $C_{10-16}$ alkanediol polyglycol ether containing 6 to 20 glycol ether groups as the emulsifier.

In addition, the compositions may contain typical formulation aids and additives such as, for example, water-soluble inorganic salts, for example Mg or Ca salts, water-soluble complexing agents, water-soluble thickeners, water-soluble cationic polymers and also dyes and fragrances, pearlescers, bleaching agents, redeposition inhibitors, brighteners and foam inhibitors.

The easiest way of producing the laundry aftertreatment compositions according to the invention is simply to mix the components. For example, the water may be heated to 40°–60° C. and the water-soluble quaternary ammonium compound (B), the water-insoluble quaternary ammonium compound (A), the terpene compound (C) and the emulsifier (E) subsequently added in that order and homogenized by stirring. Foaming should be avoided. After the dyes have been added, a temperature of 20° C. is adjusted by cooling. The pH value is then adjusted to 1–5 by addition of the acid (D).

The following Examples are intended to illustrate the invention:

EXAMPLES

Compositions according to Table I were prepared by mixing the components in the quantities shown. The following commercial products were used:

Bardac 2270 E : didecyl dimethyl ammonium chloride, 70% by weight in ethylene glycol Stepantex DO 90: dioleyl hydroxyethyl methyl ammonium methosulfate Epicol G 2, G 10: product of the addition of 1 mole of ethylene glycol and 10 moles of ethylene oxide to an α-$C_{12-14}$-epoxyalkane Genamin S 250 : product of the addition of 25 moles of ethylene oxide to 1 mole of stearyl amine Bardac 2270 E, Stepantex DO 90, pine oil and Epicol G2, G10 were added with stirring in that order to water heated to 45° C., followed by stirring until a homogeneous and clear solution was formed. The solution was then cooled to 20° C. and formic acid was added. After brief intensive mixing, the whole was stirred for 15 minutes.

| Composition | 1 | 2 | 3 | 4 | 5 | 6 |
|---|---|---|---|---|---|---|
| Bardac 2270 E | 10 | 10 | 10 | 10 | 6.5 | 6.5 |
| Stepantex DO 90 | 2.5 | 5.0 | 5.0 | 7.5 | 2.5 | 5.0 |
| Genamin S 250 | 2.5 | 2.5 | 2.5 | 2.5 | — | — |
| Epicol G 10 | 2.5 | 2.5 | 2.5 | 2.5 | 3.0 | 5.0 |
| Pine oil | 1.5 | 0.5 | 1.5 | 1.5 | 0.5 | 1.5 |
| Formic acid | 18.0 | 5.2 | 18.0 | 18.0 | 5.0 | 5.0 |
| Water, deionized | 63 | 74.3 | 60.5 | 58 | 69 | 63.5 |
| Viscosity (mPas) 20° C. | 10 | 10 | 10 | 10 | 10 | 10 |
| Appearance 20° C. | Clear | Clear | Clear | Clear | Clear | Clear |
| pH value | 1 | 2 | 1 | 1 | 1.5 | 1.5 |

What is claimed is:

1. An aqueous composition for the aftertreatment of washed laundry, said composition consisting of
   (A) 0.1% to 30% by weight of a water-insoluble quaternary ammonium compound corresponding to formula I:

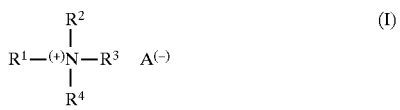

$$R^1 - {}^{(+)}N - R^3 \quad A^{(-)}$$
with $R^2$ above N and $R^4$ below N (I)

in which $R^1$ and $R^2$ are alkyl groups containing 16 to 22 carbon atoms or groups having the formula $R^5CO(XC_nH_{2n})_a$, wherein $R^5CO$ is a linear acyl group containing 18 to 22 carbon atoms, X is oxygen or —NH—, n is 2 or 3, a is 1 to 4, $R^3$ has the same meaning as $R^1$ or $R^2$ or is an alkyl group containing 1 to 4 carbon atoms and $R^4$ is an alkyl group containing 1 to 4 carbon atoms or a hydroxyalkyl group containing 2 to 4 carbon atoms and $A^{(-)}$ is a halide or methoxysulfate anion, (B) 0.1% to 50% by weight of a water-soluble quaternary ammonium compound corresponding to formula II:

$$R^6 - {}^{(+)}N - R^8 \quad A^{(-)}$$
with $R^7$ above N and $R^9$ below N (II)

in which $R^8$ is an alkyl group containing 6 to 16 carbon atoms, $R^7$ is an alkyl group containing 1 to 12 carton atoms or a benzyl group, $R^8$ and $R^9$ are alkyl groups containing 1 to 4 carbon atoms or hydroxyalkyl groups containing 2 to 4 carbon atoms and $A^{(-)}$ is a halide or methoxysulfate anion, (C) 0 to 5% by weight of a terpene compound or a wood oil distillate containing a terpene compound, (D) 0.1% to 20% by weight of a water-soluble inorganic acid or organic carboxylic acid or hydroxycarboxylic acid containing 1 to 6 carbon atoms to adjust the composition to 3 pH value of 1 to 5, (E) 0.1% to 20% by weight of an emulsifier comprising an ethylene oxide adduct of a hydroxy functional fatty compound having an HLB value of 12 to 19, and (F) the balance, water.

2. A composition as in claim 1, wherein said water-insoluble quaternary ammonium compound (A) is a compound corresponding to formula I in which $R^1$ and $R^2$ are acyloxyalkyl groups having the formula $R^5CO(OC_nH_{2n})_a$—, wherein $R^5CO$ is a linear acyl group containing 16 to 18 carbon atoms, n is 2 or 3 and a is 1 to 4, $R^3$ has the same meaning as $R^1$ or $R^2$ or is an alkyl group containing 1 to 4 carbon atoms and $R^4$ is an alkyl group containing 1 to 4 carbon atoms or a hydroxyalkyl group containing 2 to 4 carbon atoms and $A^{(-)}$ is a halide or methoxysulfate anion.

3. A composition as in claim 2 wherein $R^5CO$ is an oleyl group or an acyl group derived from a tallow or palm oil fatty acid containing more than 50% by weight of oleic acid.

4. A composition as in claim 1 wherein said water-soluble quaternary ammonium compound (B) is a compound corresponding to formula II in which $R^6$ and $R^7$ are alkyl groups containing 6 to 12 carbon atoms.

5. A composition as in claim 1 wherein said wood oil distillate (C) comprises pine oil.

6. A composition as in claim 1 wherein said water-soluble acid (D) is an organic carboxylic acid containing 1 to 4 carbon atoms or a hydroxycarboxylic acid containing 2 to 6 carbon atoms.

7. A composition as in claim 1 consisting of
   (A) 1% to 10% by weight of said water-insoluble quaternary ammonium compound corresponding to formula I,
   (B) 2% to 15% by weight of said water-soluble quaternary ammonium compound corresponding to formula II,
   (C) 0.1% to 2% by weight of pine oil,
   (D) 1% to 10% by weight of formic acid, glycolic acid or lactic acid,
   (E) 1% to 10% by weight of a $C_{10-16}$ alkanediol polyglycol ether containing 6 to 20 glycol ether groups, and
   (F) the balance, water.

* * * * *